Patented Oct. 8, 1935

2,016,848

UNITED STATES PATENT OFFICE 2,016,848

METHOD OF SEPARATING PHENOLIC ISOMERS

Nicholas P. Akimoff, Richmond Heights, Mo., assignor to Monsanto Chemical Company, St. Louis, Mo., a corporation of Delaware No Drawing. Application May 7, 1934,
Serial No. 724,457

5 Claims. (Cl. 260—64)

This invention relates to the separation of ortho and para benzyl or phenyl phenols. It is well known that when phenol is caused to react with benzyl chloride one obtains a mixture of ortho and para benzyl phenols. For some purposes, as, for example, in the manufacture of pharmaceuticals, dyestuffs and dyestuff intermediates, it is desirable to have one of the isomers to the exclusion of the other.

I have found that the separation of these materials may be effected conveniently and completely by taking advantage of the peculiar behavior of their alkali salts. Thus, I have found that when a mixture of the phenols is converted to the corresponding alkali salts in the presence of the usual organic liquids for preparing phenates in anhydrous form, the ortho compound remains in solution whereas the para compound precipitates in a readily filterable and easily separable form.

The following example will serve to illustrate the principles of my invention:

A mixture of ortho and para benzyl phenol is heated in the presence of a liquid such as xylene, toluene, chlorbenzene, dichlorbenzene and the like, and a mol equivalent of alkali, such, for example, as sodium hydroxide. The sodium hydroxide can be added conveniently, for the purpose of my invention, as a concentrated aqueous solution. Water which is introduced with sodium hydroxide, as well as the water formed by the reaction of the sodium hydroxide with the phenols, is then removed by distillation in the usual manner and preferably under vigorously agitated conditions. After all of the water has thus been eliminated the para isomer will be found to be present as a suspension whereas the ortho isomer will remain in solution. By filtering the mixture one can separate the two and thereafter recover the ortho isomer by acidification of the filtrate or use the product in other syntheses if required in the phenate form. Thus the separated phenates may be carbonated to form their corresponding carboxylic derivatives according to the well known Kolbe reaction. The para benzyl phenate which is separated by filtration may be washed with dry benzol and upon acidification will be found to be substantially pure para isomer.

In lieu of xylene or orthodichlorbenzene one may employ other organic liquids which are inert, non-aqueous solvents of phenols and which form azeotropic mixtures with water whereby the water present in the mixture may be eliminated. In general, I prefer to employ materials of this class which are liquids but which have a relatively high boiling point since this facilitates and expedites the removal of the water.

What I claim is:

1. The method of separating para benzyl phenol from a mixture thereof with ortho benzyl phenol which comprises forming the alkali phenate, subjecting the same to an inert, non-aqueous organic solvent for phenol, under substantially anhydrous conditions, and separating the solid para benzyl phenate from the solution containing the ortho isomer.

2. In the manufacture of ortho benzyl salicylic acid from a mixture of ortho and para benzyl phenols, the step which comprises forming the sodium phenate salts of the benzyl phenol mixture, separating the isomers by means of an inert, non-aqueous organic solvent for phenol whereby the ortho benzyl phenate is dissolved, separating the insoluble para isomer, and carbonating the separated ortho isomer.

3. The method of separating the ortho and para isomers of benzyl phenols, which comprises converting the mixture to the corresponding sodium phenates, and separating the ortho and para isomers by dissolving the ortho isomer in an inert, non-aqueous solvent for phenol, and separating the relatively insoluble para isomer from the solution containing the ortho isomer.

4. The method of separating the ortho and para isomers of benzyl phenol that comprises treating the corresponding phenates in anhydrous condition with an inert, non-aqueous solvent for phenol whereby the ortho isomer is dissolved and the para isomer remains in suspension, and separating the suspended para isomer from the dissolved ortho isomer.

5. The method of separating the ortho and para isomers of benzyl phenol which comprises dissolving the mixture of isomers in an organic, inert solvent, adding a water solution of alkali metal hydroxide thereto to form the corresponding alkali metal phenate, evaporating the water, and filtering off the insoluble para benzyl phenate from the solution while leaving the corresponding ortho benzyl phenate in solution.

NICHOLAS P. AKIMOFF.